(12) United States Patent
Ashida et al.

(10) Patent No.: US 6,345,865 B1
(45) Date of Patent: Feb. 12, 2002

(54) VEHICLE SEAT, A SKIN MATERIAL FOR A VEHICLE SEAT AND A METHOD OF MANUFACTURING THE VEHICLE SEAT

(75) Inventors: Nobukatsu Ashida, Fujimi; Iwao Miyajima, Niiza; Akira Sugimoto, Tokyo, all of (JP)

(73) Assignee: T.S. Tech Co., Ltd. (JP)

( * ) Notice: Subject to any disclaimer, the term of this patent is extended or adjusted under 35 U.S.C. 154(b) by 0 days.

(21) Appl. No.: 09/303,498

(22) Filed: Apr. 30, 1999

(30) Foreign Application Priority Data

Dec. 28, 1998 (JP) .......................... 10-374534
Dec. 28, 1998 (JP) .......................... 10-374535
Dec. 28, 1998 (JP) .......................... 10-374536

(51) Int. Cl.$^7$ ................................... B62J 1/00
(52) U.S. Cl. ............... 297/195.1; 297/214; 297/452.61
(58) Field of Search ...................... 297/195.1, 214, 297/452.58, 452.61, 452.62; 5/699, 653, 655.9, 737

(56) References Cited

U.S. PATENT DOCUMENTS

| 4,403,356 A | * | 9/1983 | Urai ................. 297/452.62 X |
|---|---|---|---|
| 4,844,761 A | | 7/1989 | Braccsco ................ 156/220 |
| 5,058,955 A | * | 10/1991 | Sugiura et al. ........ 297/452.61 |
| 5,395,473 A | * | 3/1995 | Nixon .................. 297/452.62 |
| 5,669,670 A | * | 9/1997 | Haraguchi et al. ..... 297/452.61 |
| 5,858,159 A | * | 1/1999 | Holbrook et al. ... 297/452.61 X |

FOREIGN PATENT DOCUMENTS

JP          10309787        11/1998

* cited by examiner

Primary Examiner—Laurie K. Cranmer
(74) Attorney, Agent, or Firm—Lorusso & Loud

(57) ABSTRACT

The vehicle seat of the invention includes a cushioning material having a ridge surrounding and defining a seating area on the cushioning material and a skin material covering the cushioning material. The skin material and cushioning material are bonded together only within the seating area. The skin material is a laminate including, in succession, a PVC layer, a knitted fabric and a closed-cell synthetic resin foam. A water proof film may be interposed between the cushioning material and the skin material outside of the seating area.

11 Claims, 8 Drawing Sheets

VEHICLE SEAT, A SKIN MATERIAL FOR A VEHICLE SEAT AND A METHOD OF MANUFACTURING THE VEHICLE SEAT

BACKGROUND OF THE INVENTION

1. Field of the Invention

The present invention concerns a vehicle seat and, particularly, it relates to a vehicle seat used outdoors and a method of manufacturing a vehicle seat, which has good finish, good physical properties, durability and weather resistance and which can be manufactured efficiently, as well as a skin material for the vehicle seat.

2. Statement of the Related Art

A vehicle seat has been formed, for example, by disposing a cushioning material on a bottom plate and covering with a skin material. For the vehicle seat, a concave/convex shape has been proposed particularly in view of aesthetics and comfort in riding. For example, a method of using a tack last technique for forming the concave/convex portion and the covering a cushioning material with a skin material by stitching have been used in manufacturing seats of concave/convex shape.

In the tack last method, as shown in FIG. 10, a concave line is formed to a cushioning material 120 and a skin material 110 is tack lasted by a tack last means (tack last string) 140 to a bottom plate 130.

The tack last seat described above involves a problem in that a distinct feeling for the concave/convex shape can not be obtained when the concave line forms a complicated curve (such as an S-shaped curve) or a three dimensional curve, unless many tack last points are set on every turning point of the curve.

However, if the number of tack last points is increased in order to overcome the above-described problem, the result is a dimple-like appearance of the outer surface, as well as less efficiency in the assembling operation. Further, since the tack last portions receive concentrated forces, the skin material and the tack last means are sometimes detached.

The method of covering a cushioning member 120 with a skin material 110 having the concave/convex shape formed by stitching suffer from the drawback that the skin material 120 and the cushioning material 120 separate at the concave/convex portion, particularly, at the concave portion.

In order to solve the foregoing problem, vehicle seats have been formed by applying an adhesive to the seating area of the cushioning material and bonding the skin material thereto. In this vehicle seat, the adhesive is applied to predetermined portions including ridges of the cushioning material.

However, when a rider sits on the seat, since the load is concentrated on the ridges of the cushioning material where the skin material is secured, excessive force is exerted on the skin material to undesirably flex or crease the seat.

Further, in covering the cushioning material 120 with the skin material 110, it is necessary to prevent water and dust from entering into the cushioning material 120 where the skin materials 110 are joined to each other by stitching. For this purpose, a water proof film (not illustrated) is disposed between the skin material 110 and the cushioning material 120 at the stitched portions of the skin material 110 to prevent intrusion of rain water or the like.

In using the water proof film described above, it is necessary to dispose the water proof film accurately to prevent water and dust from intruding.

Further, in a vehicle seat formed by covering the cushioning material 120 with the skin material 110 by stitching, since the skin material 110 and cushioning material 120 tend to separate at the concave/convex portions, particularly, at concave portions, in one method an adhesive is applied between the skin material 110 and the cushioning material 120 to prevent separation.

When the adhesive is applied between the skin material 110 and the cushioning material 120, if the water proof film is not disposed at an appropriate position, the water proof film comes into the region of the adhesive and become twisted or the water proof film, if between the adhesive and the skin material 110, interferes with the adhesion between the skin material 110 and the cushioning material 120.

Therefore, it is necessary to accurately cut off the water proof film at exact positions, but the operation while confirming the cut off position is laborious and inefficient.

Further, the vehicle seat is generally formed as an integral cellular molding comprising a skin material, a cushioning material and a bottom plate, for example, a polyvinyl chloride skin material and a polyurethane cellular material.

As shown, for example, in FIG. 15 and FIG. 16, the vehicle seat comprises a skin material 110 and a cushioning material 120, and the skin material 110 includes an acrylic material 111 applied to a synthetic resin 112 or to a synthetic resin 112 laminated on a substrate fabric 113. Then, the skin material 110 is bonded to the surface of the synthetic resin 112 or the substrate fabric 113 using an adhesive 140.

In the prior art described above, if a polyvinyl chloride skin material is used, for example, as the synthetic resin 112, an undesirable vinyl resin-like gloss appears on the surface.

Further, contact between the skin material 110 and the cushioning material 120 results in the following disadvantages.

(1) A plasticizer contained in the synthetic resin 112 migrates to and degrades the cushioning material 120.

(2) When a plasticizer contained in the synthetic resin 112 migrates to the cushioning material 120, the amount of the plasticizer contained in the synthetic resin 112 is decreased to make the synthetic resin 112 hard and to worsen the feel upon sitting on the seat.

(3) Amine catalyst contained in the cushioning material 120 adversely affects the synthetic resin 112 to cause discoloration or fading of the synthetic resin 112, thereby detracting from the aesthetic appearance of the vehicle seat.

(4) If a solvent type adhesive is used as the adhesive 140 for bonding the skin material 110 to the cushioning material 120, the solvent contained in the adhesive migrates to the synthetic resin 112 to discolor the synthetic resin 112.

For overcoming the drawbacks described above, a method has been developed for preventing migration of the plasticizer or the amine catalyst, which method involves placing an amide type resin film or a polyethylene type resin film between the skin material and the cushioning material, but this method increases the number of components, makes the manufacturing cost expensive and increases the number of steps.

SUMMARY OF THE INVENTION

An object of the present invention is to provide a vehicle seat in which a water proof film is disposed accurately at stitched portions of a skin material covering a cushioning material and reliably preventing water or dust from intruding through the stitched portions of the skin material, as well as to provide a method of manufacturing such a vehicle seat.

Another object of the present invention is to provide a vehicle seat with a preferred finish, having high durability and capable of being manufactured efficiently, as well as to provide a method of manufacturing such a vehicle seat.

A further object of the present invention is to provide a skin material for use in a vehicle seat having a satisfactory appearance, and capable of preventing a plasticizer contained in the synthetic resin of the skin from migrating into the cushioning material without increasing the number of components or number of steps, thereby preventing an uncomfortable feeling upon sitting on the seat and degradation of the cushioning material.

A further object of the present invention is to provide a skin material for use in a vehicle seat free from the worry of discoloration or fading of the skin material caused by an amine catalyst contained in the cushioning material.

A further object of the present invention is to provide a skin material for use in a vehicle seat capable of resisting discoloration by migration of a solvent to the skin material when a solvent type adhesive is used for bonding the skin material to the cushioning material.

A still further object of the present invention is to provide a skin material for use in a vehicle seat that can be bonded by high frequency welding.

A still further object of the present invention is to provide a skin material for use in a vehicle seat having a satisfactory leather-like feeling, with no loss of comfort due to abrupt shifting of load when a rider sits on the seat and high resistance to weathering.

In the present specification, "vehicle seat" includes seats for land motorcycles and scooters, as well as snowmobiles and water motorcycles and, further, includes vehicle seats for tricycle buggy vehicles, mounting vehicles and construction machine seats.

The present invention is to be explained with reference to embodiments based on claims.

FIGS. 1 and 2 show a vehicle seat S in accordance with an embodiment of the present invention, as including a cushioning material 20 disposed on a bottom plate 30 and the cushioning material 20 covered with a skin material 10.

The skin material 10 and the cushioning material 20 are bonded with an adhesive 40 coated in a region 50, inward of a ridge 23, which forms a seating area of the cushioning material 20. The adhesive 40 is coated on one or both of the skin material 10 and the cushioning material 20.

When the skin material and the cushioning material are bonded by the adhesive in this way, the adhesive facilitates the assembling of the cushioning material and the skin material.

Further, since the adhesive is coated in a region inward of the ridge for the cushioning material, the skin material is not secured at the ridge portion which receives the most localized load, so that no excessive force is exerted on the skin material, thereby preventing flexion and creasing, and providing a vehicle seat of good appearance.

Further, the skin material 10 is formed by joining a skin material 10a for the seating area and a skin material 10b surrounding the seating area. By stitching of a plurality of skin materials in this way it is possible to form a desired concave/convex shape.

As shown in FIGS. 3 and 4, a concave groove 22 is formed along a line 10c joining the skin material 10a and the skin material 10b, on the side of the ridge 23 adjacent the cushioning material 20. Then, a water proof film 21 is disposed between the skin material 10 and the cushioning material 20 and extending from the skin material 10b to the concave groove 22.

As described above, in the vehicle seat of this embodiment, since the concave groove is formed at a predetermined position including the joining line on the side of the ridge adjacent the cushioning material, the water proof film can be appropriately positioned by disposing the water proof film against that portion of the skin material which surrounds (excludes) the seating area to the concave groove, with the concave groove serving as a guide line.

The skin material 10 comprises a PVC layer 12, a substrate fabric 13 composed of a knitted material and a closed-cell cellular synthetic resin 14, laminated in this order, and an acrylic or vinyl chloride type surface material 11 applied over the PVC layer 12.

As described above, since the surface material 11 is disposed on the PVC layer 12, embossing can be applied to the surface material 11, thereby providing the seat surface with a leather-like feel to obtain a satisfactory vehicle seat having good appearance.

When a vinyl chloride-acrylate copolymer resin or a vinyl chloride-methacrylate copolymer resin is used as the surface material 11, high frequency welding can be used to secure the skin materials 10 to each other or to secure the periphery of the skin material 10 to the bottom plate 30 reliably and easily.

The substrate fabric 13 is a knitted material made of at least one of nylon yarns, polyester yarns and rayon yarns.

Since the substrate fabric 13 is disposed adjacent the PVC layer 12, when the skin material 10 is pulled, no direct force is applied to the closed-cell cellular material 14 and breakage of the closed-cell cellular material 14 is thereby prevented.

Further, since the closed-cell cellular material 14 is present between the PVC layer 12 of the skin material 10 and the cushioning material 20, the plasticizer contained in the PVC layer 12 cannot migrate through the substrate fabric 13 to the cushioning material 20, thereby preventing degradation of the cushioning material 20.

Further, since the closed-cell cellular material 14 is present between the PVC layer 12 and the cushioning material 20, because the plasticizer contained in the PVC layer 12 can not migrate through the substrate fabric 13 to the cushioning material 20, hardening of the PVC layer due to a decrease of the plasticizer is prevented.

Further, since the closed-cell cellular material 14 is present between the PVC layer 12 and the cushioning material 20, an amine catalyst contained in the cushioning material 20 can not migrate into the PVC layer 12 to cause it to discolor or fade. In this way, it is possible to prevent deterioration of the aesthetic appearance of the vehicle seat upon constant exposure to the weather.

Further, since the cellular material 14 with a closed-cell structure is present between the PVC layer 12 and the cushioning material 20, a solvent contained in the adhesive for bonding the skin material 10 to the cushioning material 20 can not migrate into the PVC layer 12 to discolor the PVC layer 12.

The closed-cell cellular material 14 may suitably be a crosslinked cellular material and, more specifically, a PVC cellular material.

Crosslinked cellular material has heat resistance and shows excellent weather resistance when exposed to broiling temperatures for a long period of time.

Further, use of the PVC cellular material as the closed-cell cellular material 14 can reliably cover the cushioning material 20 of poor water resistance, thereby ensuring the weather resistance of the seat. Further, this can provide a satisfactory leather-like feel to the skin material.

Furthermore, since the laminate of the cushioning closed-cell cellular material 14 on the cushioning material 20 moderates impact shock, shocks to the rider are moderated. Furthermore, it prevents degradation by abrupt shifting of load upon sitting provides high durability.

The skin material 10 may contain a protein material to give the surface of the vehicle seat a smooth and fresh feeling, rather than a sticky feeling. Further, the protein prevents undesirable moisture on the seat and facilitates cleaning the seat surface. Furthermore, it also provides a moderate gloss to the surface of the seat and thereby improves the aesthetic appearance of the seat.

The method of manufacturing the vehicle seat comprises the following steps.

First, an adhesive 40 is coated over an area of the cushioning material 20 inward of ridge 23, i.e., over the seating area. Further, an adhesive 40 is coated on the surface area of skin material 10 which comes into the contact with the region inward of the ridge 23, i.e., with the seating area of the cushioning material 20.

Then, the skin material 10 and the cushioning material 20 are press-bonded to cover the cushioning material 20 with the skin material 10.

Alternatively, vacuum forming of skin material 10 may be used, with the coating of an adhesive 40 on the region inward of the ridge 23 (the seating area) of the cushioning material 20. The surface of the skin material 10 is then brought into contact with the adhesive coated region of the cushioning material 20, and then press bonded thereto, thereby covering the cushioning material 20 with the skin material 10.

As described above, by vacuum formation of the skin material, it is possible to cope with even a cushioning material of an abrupt concave/convex shape, thus ensuring freedom of design and performance.

Alternatively, a concave groove 23 may be formed in cushioning material 20 on the side facing skin material 10 and at a predetermined position along joining line 10c for the skin material 10.

Then, a water proof film 21 is attached to the cushioning material 20 and cut off along the concave groove 23.

Then, an adhesive 40 is coated on the surfaces of the cushioning material 20 and the skin material 10 in contact with each other to press-bond the skin material 10 and the cushioning material 20.

As described above, in the method of manufacturing the vehicle seat according to the present invention, a concave groove is formed in the cushioning material, and the water proof film can be disposed at an appropriate position by merely cutting off the water proof film along the concave groove with the concave groove serving as a guide line, to improve efficiency.

DETAILED DESCRIPTION OF THE PREFERRED EMBODIMENTS

Figure 1:
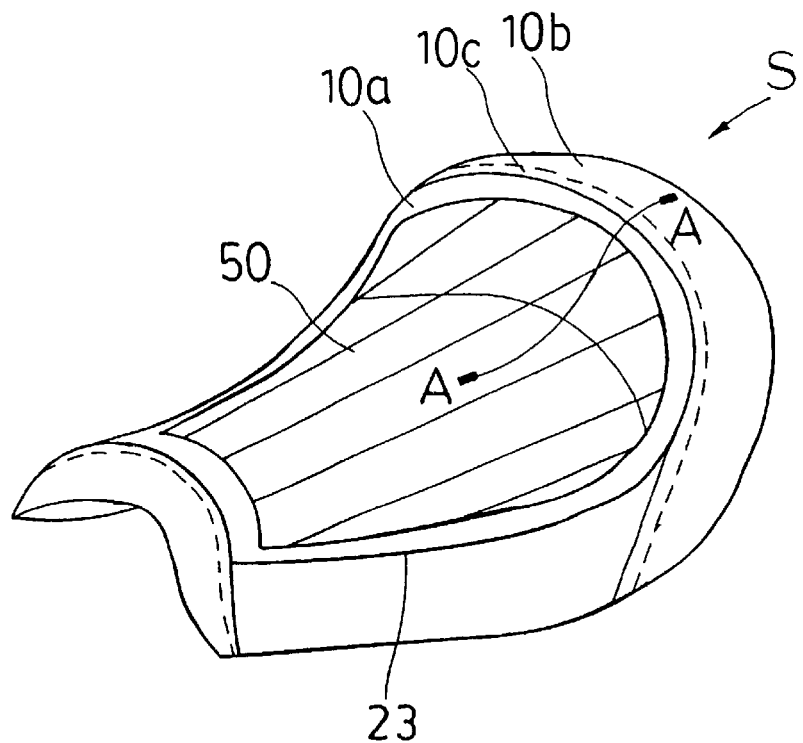
FIG. 1 is a perspective view showing a vehicle seat according to the present invention.
Figure 2:
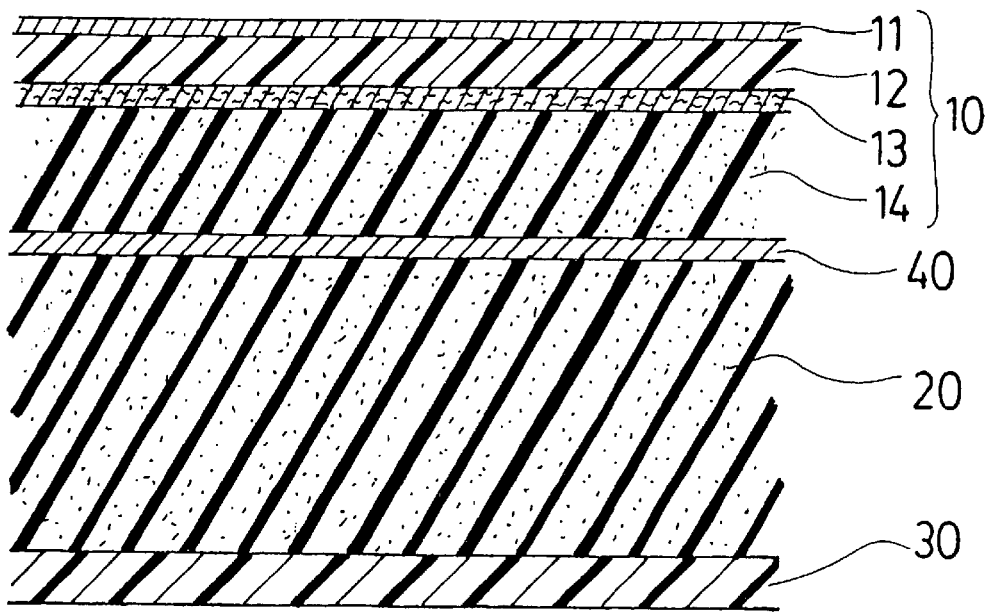
FIG. 2 is a cross-sectional taken along line A—A in FIG. 1.

FIGS. 1 and 2 show a preferred embodiment of a vehicle seat in the form of a motorcycle seat S in which a cushioning material 20 is disposed on a bottom plate 30, and the cushioning material is covered with a skin material 10. The seat is formed by placing a cushioning material 20 on the bottom plate 30, covering the cushioning material 20 with the skin material 10, and securing the periphery of the skin material 10 around the bottom plate 30.

The skin material 10 is conformed to the shape of the cushioning material 20 by stitching a skin material 10a for the seating area and a skin material 10b outside of the seating area. A line 10c is defined by the joint between the skin material 10a including the seating area and the skin material 10b surrounding and outside of the seating area.

FIG. 2 is a cross-sectional view taken along A—A in FIG. 1 and shows the skin material 10 as a laminate of a PVC layer 12 at the surface, a substrate fabric 13 and a closed-cell cellular synthetic resin 14. That is, the PVC layer 12 and the closed-cell cellular material 14 are laminated with the substrate fabric 13 therebetween. As described above, closed-cell cellular material 14 is present between the PVC layer 12 and the substrate fabric 13, and the cushioning material 20. The closed-cell cellular material 14 is a crosslinked cellular material, more specifically, a PVC cellular material.

The skin material 10 is covered a surface material 11 and embossing is optionally applied to the outside of the skin material 10 to so as to provide leather-like feeling. Embossing can be by using a known pressing machine or embossing machine such as a gravure pressing machine or roll embossing machine, and a concave/convex shape of an embossing plate is imparted to the seat by heat and pressure.

The surface material 11 in this embodiment comprises a vinyl chloride-acrylate copolymer resin or a vinyl chloride-methacrylate copolymer resin.

As the PVC layer 12, PVC and a protein powder of 1 to 40 $\mu$m grain size (for example, fine powder of natural protein fiber) compounded together may be used.

The protein powder having a grain size of from 3 to 8 $\mu$m, preferably, 4 to 7 $\mu$m is used for ensuring uniform dispersion for a thickness of the PVC material 11 that forms the surface layer of the skin material 10.

The substrate fabric 13 in this embodiment comprises a knitted material of nylon yarns, polyester yarns, rayon yarns or similar synthetic resin yarns.

In this embodiment, an adhesive (urethane-type) (not illustrated) is coated on the surfaces of the substrate fabric 13 in contact with the PVC layer 12 and the closed-cell cellular material 14, respectively. The substrate fabric 13, the PVC layer 12, and the closed-cell cellular material are thereby formed integrally together.

In this embodiment, PVC cellular material is used as an example of the closed-cell cellular material but PE foams (polyethylene foams) and PP foams (polypropylene foams) may also be used instead of the PVC cellular material, provided the material is a closed-cell cellular material.

The PVC layer 12, the substrate fabric 13 and the closed-cell cellular material 14 that constitute the skin material 10 can be laminated together, not only by the method of coating with an urethane type adhesive, but also by other known techniques.

For example, each of the layers can be bonded to each other by high frequency welder processing. A predetermined fabrication line can be formed by the high frequency welder processing.

Since the skin material 10 of this embodiment is composed of materials that can be bonded by high frequency welding, such as a surface material 11 comprising the vinyl chloride-acrylate copolymer resin or the vinyl chloride-methacrylate copolymer resin, and the PVC layer 12, high frequency welding can be applied easily for joining a plurality of skin materials. Accordingly, it is possible to join the portions efficiently and reliably.

Figure 3:
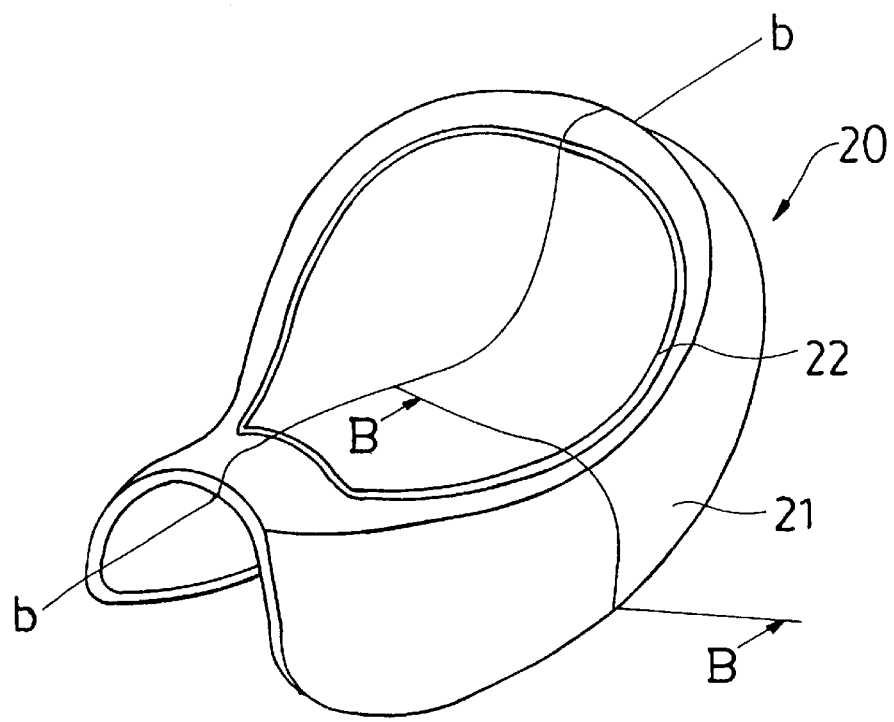
FIG. 3 is a perspective view showing a cushioning material.

The cushioning material 20 in this embodiment is made of urethane foam. As shown in FIG. 3, a water proof film 21 is appended to the cushioning material 20 at a position where a portion of the skin material 10 is to be joined in this embodiment.

Figure 4:
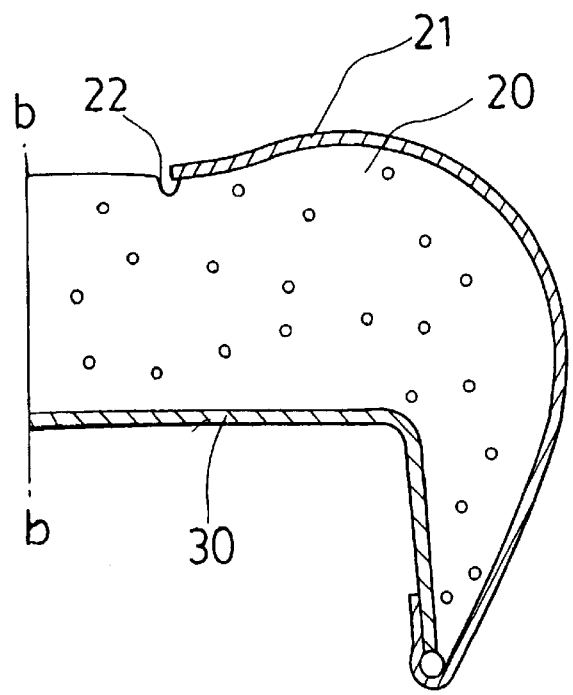
FIG. 4 is a cross-sectional view taken along line B—B in FIG. 3.
Figure 5:
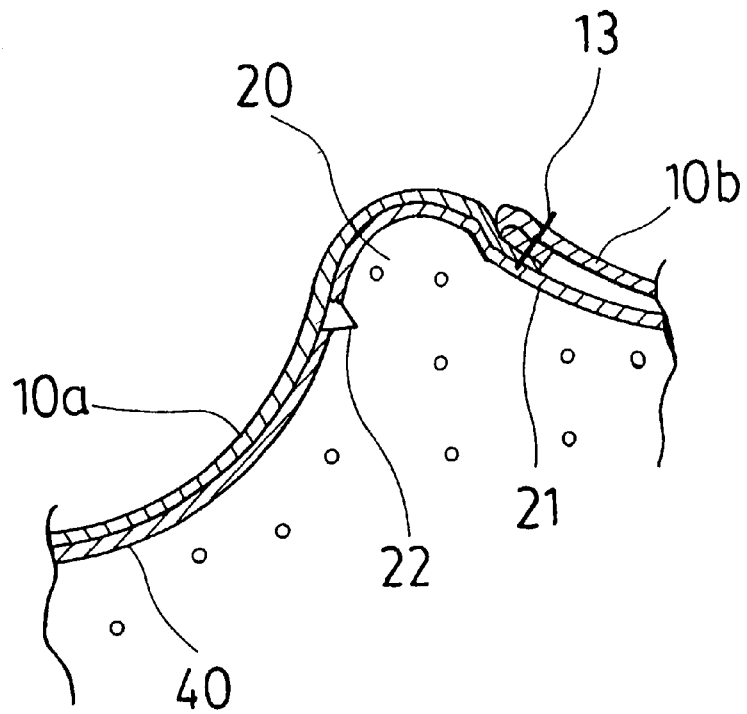
FIG. 5 is a cross-sectional view of a main portion of a vehicle seat.

FIG. 4 is a cross-sectional view taken along line B—B in FIG. 3, which illustrates a cross section of the cushioning material 20 to the right of line b—b. As shown in FIG. 4 and FIG. 5, a concave groove 22 is formed on the side of a ridge 23 of the cushioning material 20, at a predetermined position including a joining line 10c along which a skin material 10a and a skin material 10b are joined from the joining line 10c to a region of the seating area.

Figure 6:
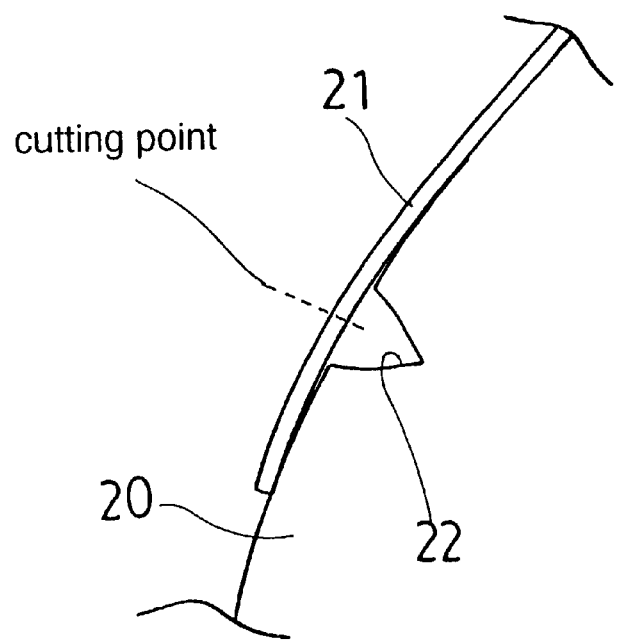
FIG. 6 is an enlarged cross-sectional view of a groove portion.

Then, the water proof film 21 is positioned with the concave groove 22 serving as a guide line. That is, as shown in FIG. 6, the water proof film 21 is cut off along the concave groove 22. Thus, the water proof film 21 is appropriately positioned on the seating face of the cushioning material 20 without extending into a bonding interface 50 between the skin material 10 and the cushioning material 20.

In this embodiment, the shape of the concave groove 22 is shown as having a substantially V-shaped cross section so that a cutting means such as scissors can be inserted easily for cutting off the water proof film 22, but the shape of the groove is not so restricted and it may also be a rectangular or substantially U-shaped cross-section.

In this embodiment, when the skin material 10 is covered over the cushioning material 20, they are bonded by an adhesive 40. The adhesive 40 is coated on one or both of the skin material 10 and cushioning material 20 and various types of adhesive may be used.

The adhesive 40 comprises, for example, a hot melt adhesive of the type containing active double bonds and which is hardened by irradiation UV-rays or electron beams, the type having epoxy groups and a latent curing agent which harden thermally, the type containing NCO groups and $Si(OR)_3$ groups which harden in the presence of moisture or the type containing SH groups and a metal oxide catalyst which are hardened by oxygen. Urethane type moisture curing adhesives are particularly preferred. An actual example of the urethane type moisture curing adhesive is a moisture curing hot melt adhesive mainly comprising a polyester type isocyanate pre-polymer, which is a commercially available product.

In this embodiment, a solvent type adhesive may also be used as the adhesive 40. As described above since the closed-cell cellular material 14 is disposed between the PVC layer 12 constituting the skin material 10 and the cushioning material 20, migration of the solvent to the PVC layer 12 is prevented.

In the motorcycle seat S of this embodiment, as shown in FIG. 1, the skin material 10 and the cushioning material 20 are bonded within a region 50 which is inward of the ridge 23 of the cushioning material 20.

The bottom plate 30 is molded from a synthetic resin in this embodiment. On this bottom plate of the synthetic resin, the cushioning material 20 is placed and the cushioning material 20 is covered with the surface material 10 and the periphery of the skin material 10 is secured to the back of the bottom plate 30. While the bottom plate 30 is made of a synthetic resin in this embodiment, various other materials may be used for the bottom plate.

The periphery of the skin material 10 can be secured to the bottom plate 30 with a securing means such as staples, or by applying high frequency welding.

Since the skin material 10 in the present invention comprises materials that can be welded by high frequency welding such as the surface material 11 made of a vinyl chloride-acrylate copolymer resin or a vinyl chloride-methacrylate copolymer resin and the PVC material, high frequency welding means such as supersonic welding or radio frequency welding can be used. The periphery of the skin material 10 can be reliably and efficiently secured by high frequency welding.

In this embodiment, a motorcycle seat S is used as an example, so that the cushioning material 20 is placed on the bottom plate 30, and the periphery of the skin material is secured to the bottom plate 30. However, in other seats, for example, a seat for use on construction machines, the cushioning material is placed on a frame, and the periphery of the skin material 10 is secured to the frame.

In the method of manufacturing the motorcycle seat S according to the present invention, an adhesive is first coated on the cushioning material 20, and the water proof film 21 is appended to the cushioning material 20. In this embodiment, with the concave groove 22 formed in the cushioning material 20, the water proof film 21 is cut off along the concave groove 22 with the concave groove 22 as a guide line.

Adhesive is then coated on the region 50 inward of the ridge 23 for the seating area of the cushioning material 20. In coating region 50, adhesive 40 is coated on one or both of the skin material 10 and the cushioning material 20.

Finally, the skin material 10 and the cushioning material 20 are press-bonded together to cover the cushioning material with the skin material 10, and the periphery of the skin material is fixed by heat treatment or tack last treatment as previously described, to complete the motorcycle seat S.

Instead of the manufacturing method described above, the skin material 10 may be molded into a concave/convex shape by vacuum forming and joined to the cushioning material 20. By vacuum forming the skin material 10, the skin material 10 can be conveniently provided with the concave/convex shape.

Figure 9:
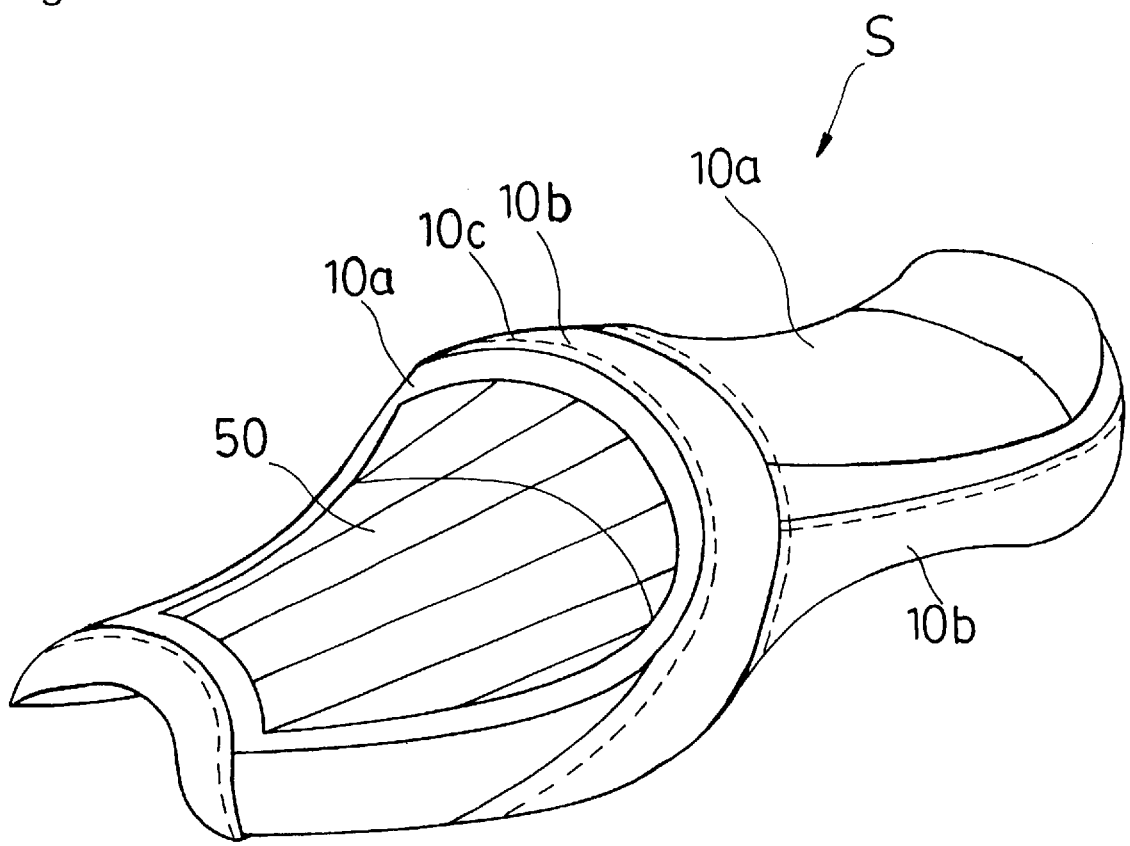
FIG. 9 is a perspective view showing an example of a seat for use in a motorcycle.
Figure 10:
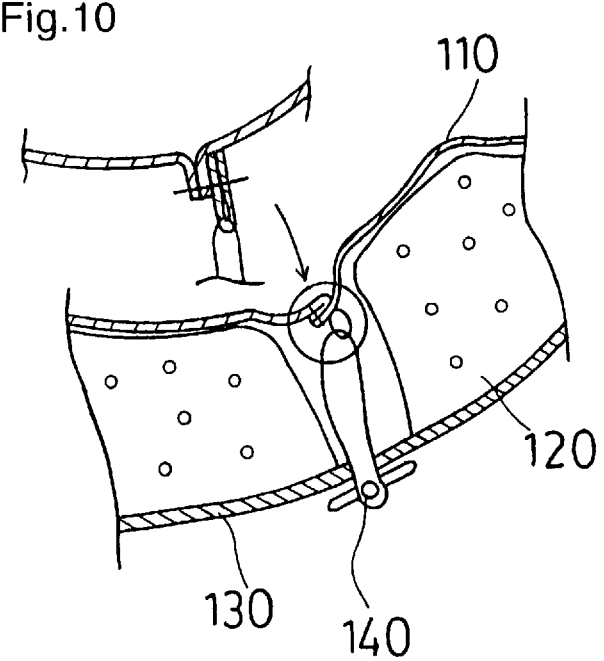
FIG. 10 is a cross-sectional view of a prior art seat.
Figure 11:
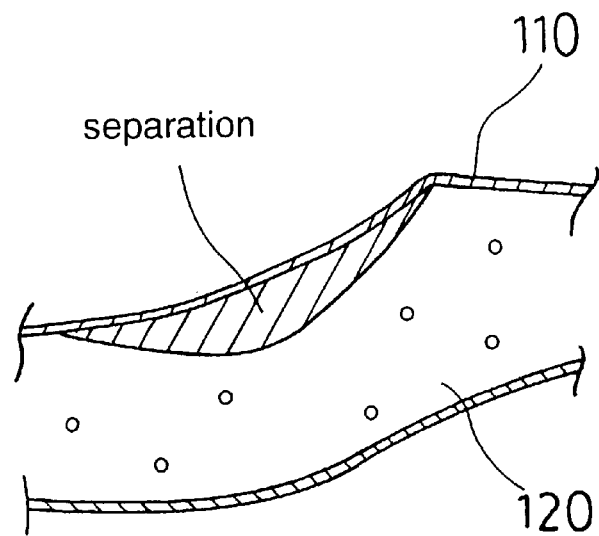
FIG. 11 is a schematic cross-sectional view showing separation in a prior art seat.
Figure 12:
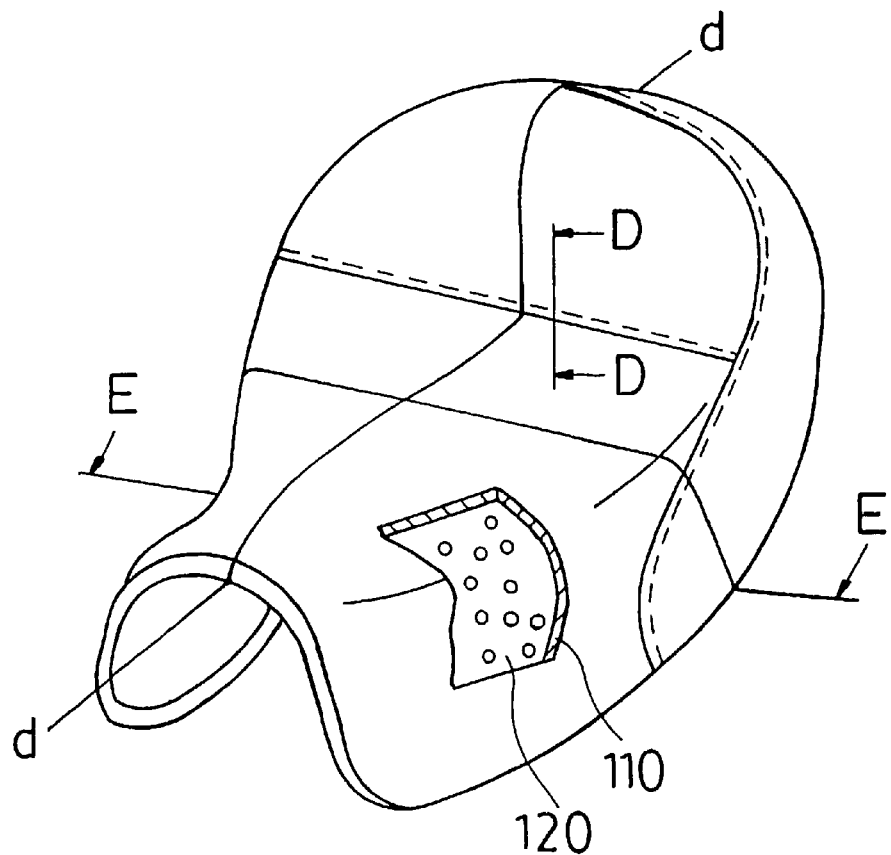
FIG. 12 is a perspective view, partially cut away, showing a prior art seat.
Figure 13:
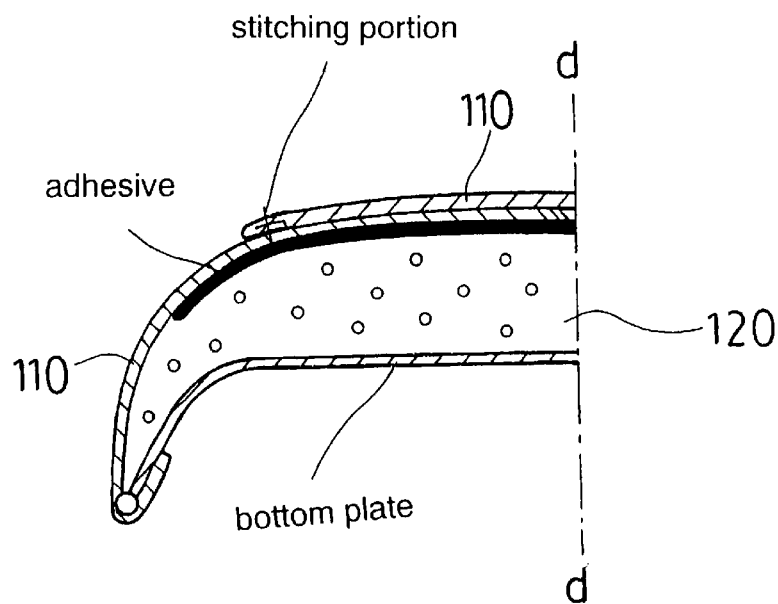
FIG. 13 is a partial cross-sectional view of a prior art seat.
Figure 14:
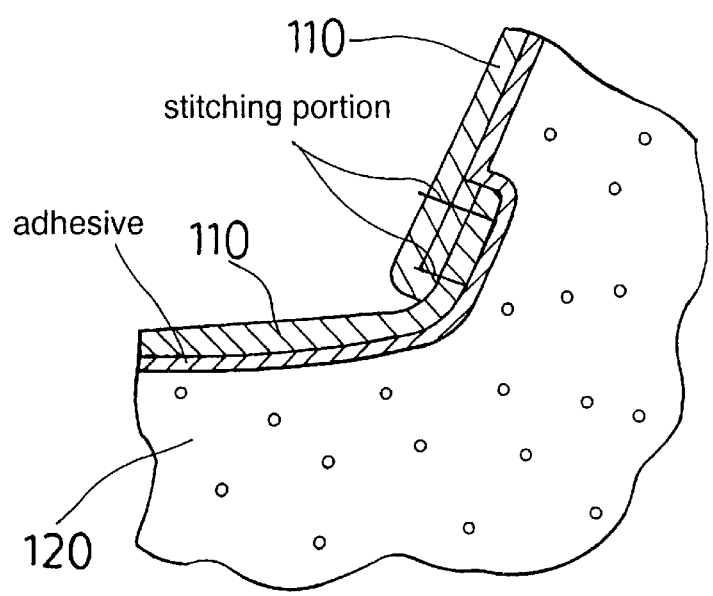
FIG. 14 is a partial cross-sectional view of a prior art seat.
Figure 15:
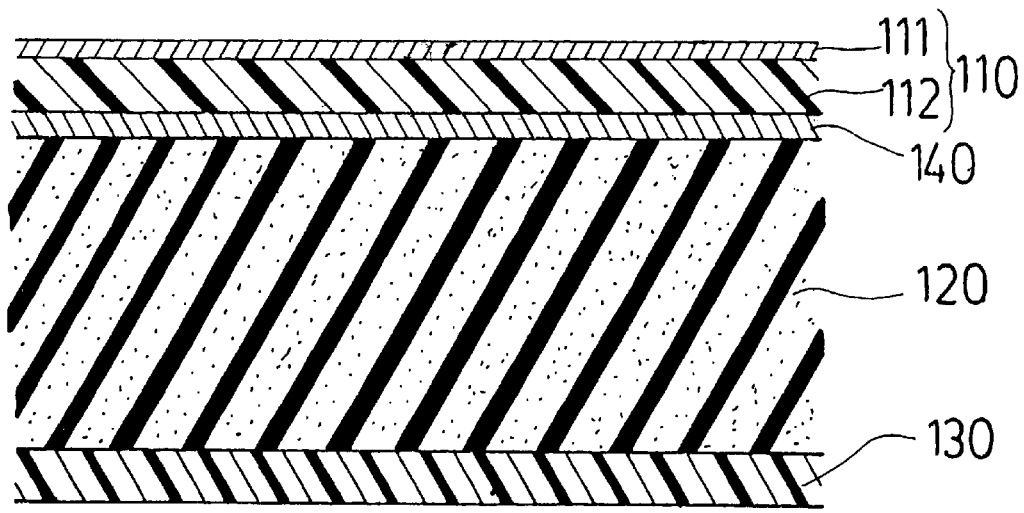
FIG. 15 is a cross-section of the material of a prior art seat.
Figure 16:
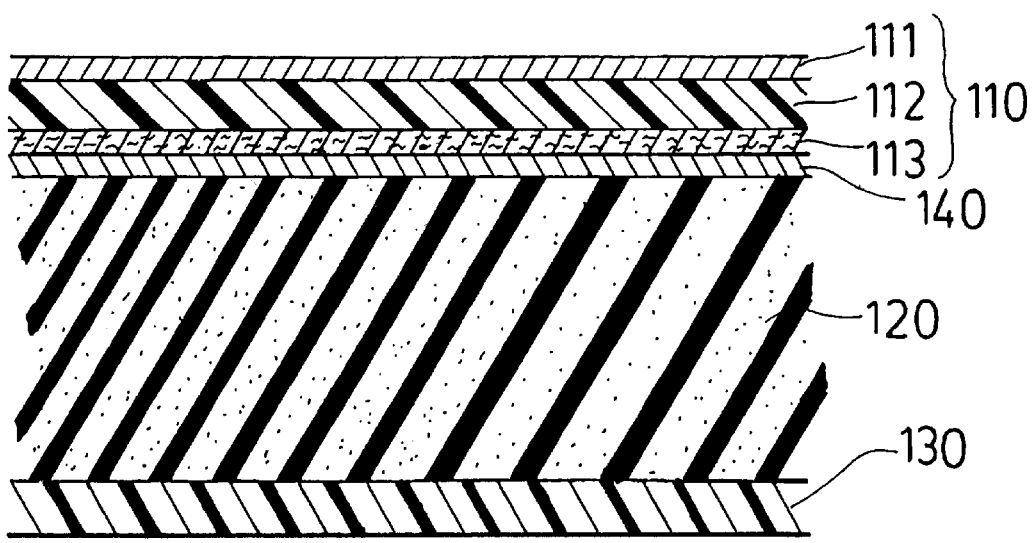
FIG. 16 is a cross-section of the material of another prior art seat.

In the prior art, when a motorcycle seat S having a complicated concave/convex shape is to be formed, a spherical configuration is formed by stitching a plurality of skin materials 10 as shown in FIG. 12 to FIG. 14 to provide the skin material 10 with a concave/convex shape conforming to the seat configuration. However, when vacuum forming is adopted, even a motorcycle seat S having a complicated concave/convex shape can be formed, for example, as shown in FIG. 9, with the skin material 10 provided with a concave/convex shape conforming to the seat configuration.

Figure 7:
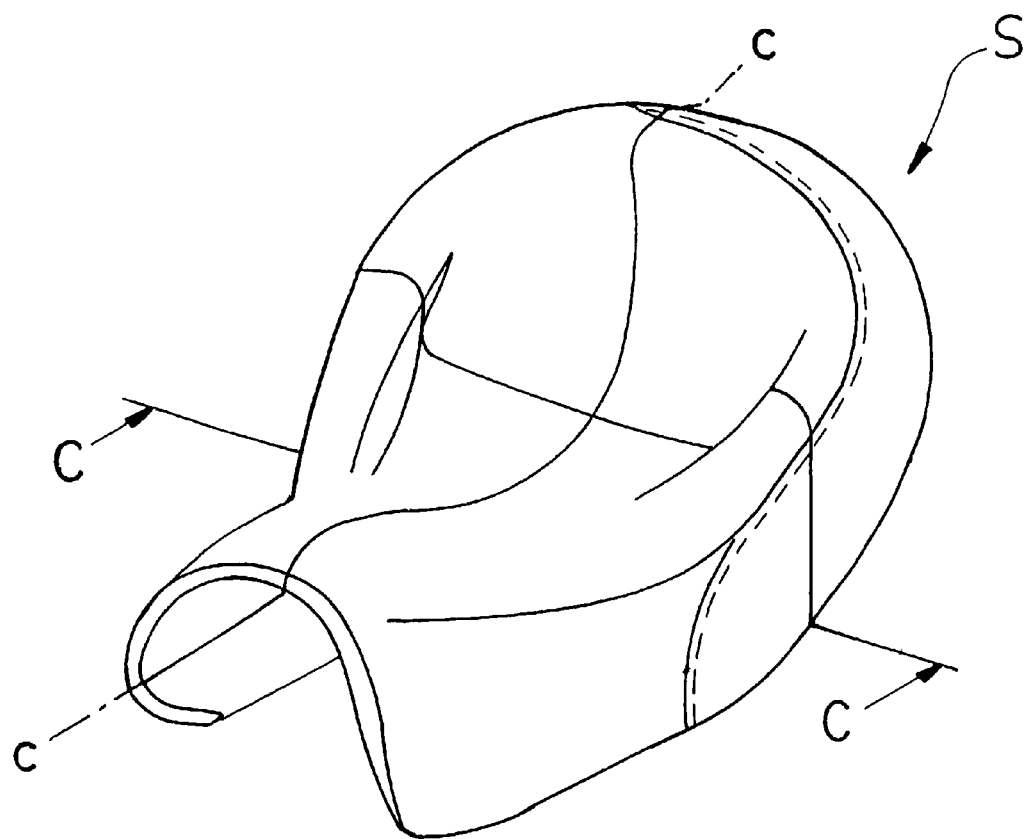
FIG. 7 is an explanatory view showing a vehicle seat having a vacuum formed skin material.
Figure 8:
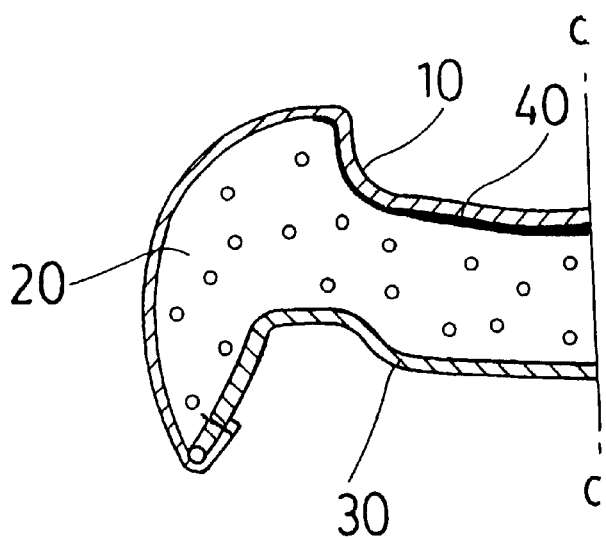
FIG. 8 is a cross-sectional view taken along line C—C in FIG. 7.

FIG. 7 shows a motorcycle seat S using a skin material 10 molded by vacuum forming. FIG. 8 is a cross sectional view taken along line C—C in FIG. 7. As shown in FIG. 8, an adhesive 40 is coated on a skin material 10 molded into a concave/convex shape by vacuum forming, and a cushioning member comprising a cushioning material 20 and a bottom plate 30 are placed under pressure in a mold frame and secured.

Alternatively, adhesive 40 may be coated on skin material 10 molded into a concave/convex shape in a mold frame and then the skin charged with a starting precursor for urethane foam and molding the same by framing.

The vacuum formation of the skin material 10 can cope with a cushioning material even if it has an abrupt concave/convex shape thereby enabling freedom of design and enabling high performance.

In the foregoing embodiment, motorcycle seat S has been described as a single-seat type motorcycle seat, but it may be a two seat type as shown in FIG. 9, and there is no particular limitation on the shape of the seat.

The present invention offers the following advantages:

(1) Since the skin material and the cushioning material constituting the vehicle seat are bonded by adhesive coated in the region inward of the ridge, which region constitutes the seating area except for the top end of the seat, the skin material is not secured at the ridge which most undergoes the localized load, so that no excessive force is exerted on the skin material thereby preventing flexion or creasing and providing a vehicle seat of favorable appearance.

(2) Since the skin material is not bonded but left free from the vicinity of the ridge of the cushioning material to its peripheral edge, covering to the cushioning material and assembling work such as tack last treatment can be conducted easily to improve the operation efficiency.

(3) Since the concave groove is formed in the cushioning material on the side facing the skin material including the seating area, at a position spaced apart by a predetermined distance from the joining line between the skin material including the seating area and the skin material outside of the seating area, the water proof film can be appropriately positioned by disposing the water proof film under the skin material outside of the seating area and extending to the position of the concave groove with the concave groove serving as a guide line.

(4) The skin material is a laminate which comprises the PVC layer, the substrate fabric made of knitted material and the closed-cell cellular synthetic resin, in succession and surface material, e.g., acrylic or vinyl chloride material, is applied over the PVC layer. Since the surface material forms the exterior of the skin material, the surface material can be embossed to provide a seat surface with a leather-like feel, to obtain a satisfactory vehicle seat having a good appearance.

(5) When the vinyl chloride-acrylate copolymer resin or the vinyl chloride-methacrylate copolymer resin is used for the surface material, high frequency welding can be applied to bond the skin materials to each other and to secure of the periphery of the skin material to the bottom plate reliably and easily.

(6) Since the substrate fabric is disposed adjacent the PVC layer, when the skin material is pulled, the tension is not directly exerted on the closed-cell cellular material, thereby preventing breakage of the closed-cell cellular material.

(8) Since the closed-cell cellular synthetic resin material is present between the PVC layer constituting the skin material and the cushioning material, migration of the plasticizer contained in the PVC layer through the substrate fabric to the cushioning material is eliminated and degradation of the cushioning material prevented.

(9) Since the closed-cell cellular synthetic resin material is present between the PVC layer constituting the skin material and the cushioning material, migration of the plasticizer contained in the PVC layer through the substrate fabric to the cushioning material can be eliminated to prevent the PVC layer from hardening due to loss of the plasticizer and to preserve the feel of the seat.

(10) Since the closed-cell cellular synthetic resin material is present between the PVC layer constituting the skin material and the cushioning material, migration of the amine catalyst contained in the cushioning material to the PVC layer can be eliminated to prevent discoloration and fading of the PVC layer. As described above, it is possible to prevent deterioration of the aesthetic appearance of a vehicle seat constantly exposed to the weather.

(11) Since the closed-cell cellular synthetic resin material is present between the PVC layer constituting the skin material and the cushioning material, even if a solvent type adhesive is used for bonding the skin material and the cushioning material, the solvent contained in the adhesive does not migrate to the PVC layer, to discolor the PVC layer.

(12) Since a crosslinked cellular material of excellent heat resistance is used for the closed-cell cellular material, it is possible to prevent degradation of the cellular material even when it is exposed to broiling temperatures for a long time.

(13) Since the PVC cellular material is used as the closed-cell cellular material, a cushioning material having poor water resistance, can be covered firmly to ensure weather proofness of the seat and to provide the skin material with a leather-like feel.

(14) Since a shock-moderating property is obtained by placing the cushioning closed-cell cellular material on the cushioning material, it can moderate shock to the rider and provide high durability with less deterioration caused by abrupt shifting of load upon sitting.

(15) Since protein is contained in the skin material, it provides the surface of the vehicle seat with non-tacky, smooth and fresh feel. An undesirably moist feel of the seat during sitting is also eliminated and cleaning of the seat surface is facilitated. An appropriate gloss can be provided for the seat surface to improve the appearance of the seat.

What is claimed is:

1. A vehicle seat comprising:
   a cushioning material having a ridge defining a seating area on said cushioning material;
   a skin material covering said cushioning material and bonded to said cushioning material only within said seating area, said skin material comprising, as successive layers in a laminate, a PVC layer, a substrate fabric made of a knitted material and a closed-cell cellular synthetic resin material.

2. A vehicle seat as defined in claim 1, wherein the bonding is by an adhesive coated on one or both of the skin material and the cushioning material.

3. A vehicle seat as defined in claim 1, wherein the skin material comprises a first skin portion including a region of the seating area and a second skin portion, different from said first skin portion, covering seat portions outside of the seating area and joined to said first skin portion along a joining line.

4. A vehicle seat as defined in claim 3:
wherein a concave groove is formed in the cushioning material on the seating area side of the ridge, at a predetermined position including the joining line; and further comprising:
   a water proof film disposed between the second skin portion and the cushioning material, but not between the cushioning material and the first skin portion covering the seating area, with an inner peripheral edge located at the concave groove.

5. A vehicle seat as defined in claim 1, wherein the PVC layer is overlaid with an acrylic or vinyl chloride surface material.

6. A vehicle seat as defined in claim 1, wherein the surface material comprises a vinyl chloride-acrylic ester copolymer resin or a vinyl chloride-methacrylate copolymer resin.

7. A vehicle seat as defined in claim 1, wherein the substrate fabric is a knitted material comprising nylon yarns, polyester yarns or rayon yarns.

8. A vehicle seat as defined in claim 1, wherein the closed-cell cellular synthetic resin material is a crosslinked cellular material.

9. A vehicle seat as defined in claim 1, wherein the closed-cell cellular synthetic resin material is a PVC cellular material.

10. A vehicle seat as defined in claim 1, wherein the skin material contains a protein.

11. A vehicle seat as defined in claim 1, wherein the PVC layer, the substrate fabric and the closed-cell cellular synthetic resin material are laminated and bonded by a urethane type adhesive.

* * * * *